March 24, 1959   I. E. MUSKAT ET AL   2,879,197
FOAMABLE PAD AND METHOD OF MAKING SAME
Filed April 19, 1956

Inventors,
Irving E. Muskat
and Joseph J. Klein
By: Schneider & Dressler,
Attys.

United States Patent Office 2,879,197
Patented Mar. 24, 1959

2,879,197

FOAMABLE PAD AND METHOD OF MAKING SAME

Irving E. Muskat, Miami, Fla., and Joseph J. Klein, Glencoe, Ill., assignors to Fiber Bond Corporation, a corporation of Illinois Application April 19, 1956, Serial No. 579,241

13 Claims. (Cl. 154—137)

This invention relates to a porous fibrous batt containing a foamable or foamed resinous material as a bonding agent for the batt. When a foamable resinous material is employed as the bonding agent for the fibers, it can be foamed at any desired time to produce a foamed resin, fiber reinforced pad.

The present application is a continuation-in-part of our co-pending application Serial No. 510,408, filed May 23, 1955. In that application we described a pad comprised of a batt matrix and a foamed resin. The batt matrix is preferably made of uncompressed fibers held in mechanical interengagement and by a bonding agent in three-dimensional, random arrangement throughout the length, width and depth of the batt matrix. The bonding agent is a suitable adhesive, preferably an elastic adhesive such as rubber, which bonds the fibers of the batt matrix substantially only at their points of contact. The pre-bonded batt matrix is then impregnated with a small amount of a suitable foamable resin which is then caused to foam about the individual fibers of the matrix to form a fiber reinforced pad having the spring and resiliency of all foam rubber pad.

One of the main advantages of the pad described in our co-pending application is that it can be made so easily. By employing a pre-bonded batt matrix of the type described, a pad of substantially the same thickness as that of the batt matrix can be obtained by the simple expedient of impregnating the batt matrix with a foamable resin, squeezing out excess resin (so that the resin does not fill the voids in the batt), and then causing the resin to foam or "grow" around the individual fibers. The bonded batt matrix is very resilient and manipulation thereof during the manufacturing procedure, for example by squeezing out excess foamable resin between pressure rollers, does not cause matting or balling of the fibers of the batt matrix. Instead, even after impregnation with a foamable resin, the batt springs back to its original thickness. The resin is then caused to foam. After the resin is foamed, a pad is obtained of substantially the same thickness as the original batt matrix.

We have found that it is not necessary to bond the batt matrix with an elastic adhesive before impregnating the batt matrix with a foamable resin. Instead, the foamable resin itself may be employed as the bonding agent for the fibers of the matrix. If care is taken to incorporate the foamable resin in the unbonded batt matrix there will be practically no compression or matting of the fibers of the matrix. The impregnated matrix can then be treated in two ways.

First, it may be heated to a temperature below the foaming temperature of the resin but sufficient to dry the foamable resin to a non-tacky state which is dry to the touch. After such heating, the dried, foamable resin serves as a bonding agent for the batt matrix. The resin bonded batt matrix is resilient and may be manipulated without danger of compressing or matting the fibers and thus may be shipped as an article of commerce. When compressed, the fibers will spring back to their original shape. This product can be foamed into a fiber reinforced pad at any desired time. After the resin is foamed, the resulting pad has substantially the same thickness as the original batt matrix.

Second, the batt matrix may be formed into a pad by heating it to the foaming and/or curing temperature without first heating it to dry the foamable resin to a non-tacky state. This will form a fiber reinforced and of substantially the same thickness as the original batt matrix and having substantially the same characteristics as the end product produced by the first method of treatment.

When the resin is foamed, either with or without the prior step of heating to dry the foamable resin, the resin forms a coating about the individual fibers, but does not completely fill the voids of the matrix. The resulting unitary structure has the spring and resiliency of an all foam rubber pad and retains substantially, or at least to some extent, the void formation of the matrix. The resulting pad is thus porous to air or other gaseous bodies and even to water.

In making pads in accordance with the present invention it is not necessary to employ a mold or other restraining means. This is particularly true when the batt matrix is made of fibers which are held in an uncompressed, three-dimensional, random arrangement throughout the length, width and depth of the batt. A mold may be employed, if desired, to cause the pad to assume a predetermined shape as hereinafter described.

In our preferred batt matrix, some of the fibers extend transversely throughout the depth of the batt and tie the batt into an integral structure. This batt matrix is resilient, strong and capable of being impregnated with a foamable resin without impairment of its loft until such time as the foamable resin is either dried or foamed. The batt matrix is bonded by the dried foamable or foamed resin. After such bonding, it may be manipulated or compressed and will still spring back to its original shape.

Before the batt matrix has been bonded by drying and or foaming of the foamable resin, care must be taken to prevent matting or compression of the fibers. This is particularly true at the time the batt matrix is impregntaed with the foamable resin. Matting or compression of the matrix may be avoided by lightly spraying the matrix with a liquid foamable resin in an amount sufficient to lightly coat the fibers. Too much foamable resin will fill the voids of the matrix and/or cause the fibers to matt or compress. The matrix may be carefully dipped in a liquid foamable resin, but in dipping it is difficult to control the amount of absorption of foamable resin. If the voids are filled, excess resin cannot be squeezed out without matting or compression. Furthermore, dipping will often cause voids to be filled at the surface of the matrix without any foamable resin being absorbed in other portions of the matrix. We therefore prefer a light spraying of the matrix with a liquid foamable resin.

After the fibers have been coated with the foamable resin the resin, is caused to foam about the individual fibers. This foaming takes place throughout the batt and about the individual fibers substantially simultaneously. There is no progressive foaming of the resin through the batt matrix, as in the prior art, and, consequently, the fiber and void formation of the batt matrix is substantially maintained in the final product.

By employing a batt of fibers held in random, three-dimentional relationship, it is possible to obtain a pad having the qualities of pads made solely of foam rubber or foamed resins. In such a batt matrix a minimum amount of foamable resin can, desirably, be used, sufficient to coat the fibers but short of the amount which would fill completely the voids of the matrix and destroy the porosity thereof. A pad can thus be manufactured at but a fraction of the cost of pads made of foam rubber or resin foams, as in the prior art.

A further advantage in making pads by simultaneously foaming the resin about the individual fibers in accordance with the present invention is the ability to control the thickness of the pad to rather closely held tolerances without the necessity of employing a mold or other means heretofore required to control the resin foam during its expansion. A mold may be used to shape the foamed product to a desired form, but a mold is not necessary or even desirable in the formation of a flat pad.

The pad of the present invention has substantially the same thickness as that of the batt matrix before addition of the resin foam. This is a surprising result for it was anticipated that the increase in volume of the resin during the foaming thereof would cause the fibrous matrix to expand to a thickness greater than its original thickness. The batt matrix does not expand to any appreciable extent and this fact is particularly advantageous in allowing for the manufacture of pads of desired thickness by the simple expedient of controlling the initial thickness of the matrix.

It has been found in accordance with the present invention that the resin foam "grows" around the individual fibers and forms a lattice work about the fibers with even distribution of the foam in the pad. The pad is described herein has a structural stability, resilience and loft heretofore unobtainable with prior art foamed resin, fiber-reinforced pads and retains these properties and the original thickness of the batt matrix even after repeated compressions for extended periods of time. Additionally, the pad is porous, being characterized by a labyrinth of intercommunicating voids, albeit of smaller size than the voids in the batt matrix.

Pads made in accordance with the present invention have a wide variety of uses as cushioning materials, filters, insulating materials and the like. The relative rigidity or resiliency of the pad may be varied as desired upon proper selection of the type of fibers employed in the batt matrix and the amount and nature of the resin foam employed. It will be manifest that a resin foam having sponge-like qualities will be employed in a pad used as a rug cushion, for example, whereas a more rigid resin foam would be employed more likely in a pad used for filtering or insulation purposes.

A preferred illustrative embodiment of a pad constructed in accordance with the present invention and which incorporates the above mentioned advantages and other advantages is shown in the accompanying drawings, in which.

Figure 2:
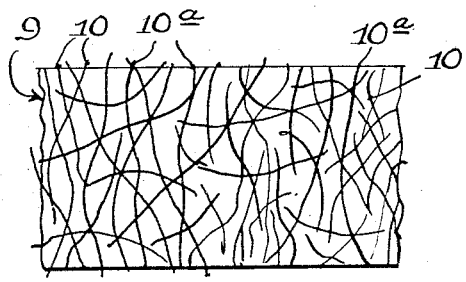
Figure 2 is an enlarged sectional view of the batt before impregnation with a foamable resin, illustrating how certain of the fibers extend transversely throughout the depth of the batt.

Referring to the drawings, the fibrous batt 9 which forms the matrix for the pad is shown in Figure 2. It is made of intersecting non-matting fibers 10 and 10A in three-dimensional, random arrangement. The fibers preferably are curled or crimped, but straight fibers of the same type may be used. It is also preferred that the fibers be coarse, to maintain the loft of the batt. We have found that satisfactory fibers are synthetic fibers such as nylon, rayon, cellulose acetate, acrylic fiber (a copolymer of vinyl chloride and acrylonitrile) commercially available under the trademark "Dynel," acrylic fiber (formed from a polymer of acrylonitrile) commercially available under the trademark "Orlon," polyvinylidene chloride-polyvinyl chloride copolymer fiber commercially available under the trademark "Saran," and the like. Nonorganic fibers such as glass fiber, commercially available under the trademark "Fiberglas," may also be used as may natural fibers such as wool, cotton or hogs hair. The above mentioned fibers may be used alone or mixed with each other.

The fibers are of various lengths, preferably from about one-half inch to two and one-half inches, and are intermingled in random arrangement so that they lay at various angles throughout the length, width and depth of the batt, to form a three-dimentional batt with the individual fibers contacting each other at their separate points of contact throughout the batt. In the preferred batt matrix illustrated in the drawings, some of the fibers extend transversely throughout the depth of the batt to insure structural stability of the batt and for this reason the length of some of the fibers should exceed the desired thickness of the batt. For example, to make a batt one inch thick, it is preferred that at least 50 percent of the fibers employed be about one and one-half inches in length. Relatively few pairs of individual fibers contact at more than one point, and each fiber contacts a plurality of other fibers at spaced points which may be in the same or in different planes.

The spaced joining of the three-dimentional, random arrangement of the fibers and the transversely extending fibers provide the batt with a body, loft and resiliency which allows for impregnation thereof with a foamable resin without compression or matting. By careful impregnation with a foamable resin, substantially the original thickness and void formation of the batt is maintained.

The use of crimped or curled fibers increases the resilience of the batt over that attained with straight fibers. As illustrated in Fig. 2, a cross section of a batt formed from crimped or curled fibers appears as a series of bridges in all directions and planes, thus giving greater loft than the same amount of straight fibers. The use of fibers of different lengths, but wherein at least 50 percent of the fibers are longer than the depth of the batt, provides a better fiber distribution throughout the batt and also provides more points of contact.

The random, three-dimensional arrangement of uncompressed fibers and the cross tying fibers which extend transversely through the depth of the batt are important where it is desired to obtain a porous pad of substantially the same thickness as the batt matrix. Fibrous batting has been made in the past, but this batting included fibers arranged randomly generally along only two dimensions, that is in single planes or layers, and, with these batts, more or less matting and compression of the fibers takes place during bonding. In contrast, the arrangement of fibers of the preferred batts used herein are random in all directions throughout the length, width, and depth of the batt, with some of the fibers 10A extending transversely throughout the depth of the batt to further help to tie the batt into an integral, unitary structure. There is no matting and compression of the fibers. By employing batts wherein the fibers are in random, three-dimensional arrangement as described, it is possible to make pads of uniform thickness, comparable to the thickness of the batt matrix, with surprisingly small quantities of resin foam.

Figure 3:
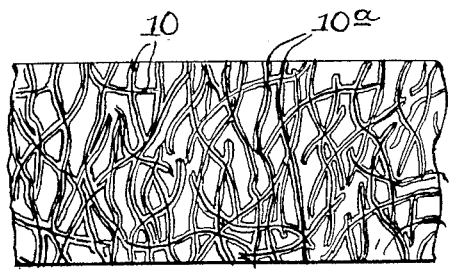
Figure 3 is an enlarged sectional view of the batt after impregnation with a foamable resin, illustrating how the individual fibers of the batt are coated with the foamable resin while still retaining the void formation of the batt.

The batt matrix above described is then lightly sprayed with a suitable foamable resin 11 so as to coat the individual fibers 10 and 10A without destroying the void formation of the batt (Fig. 3). The foamable resin may then be foamed to form and bond the pad of the present invention, or it may first be dried to a nontacky state to bond the fibers of the batt so that the batt may be handled or shipped and foamed at some later time. When it is desired to first dry the foamable resin, the foamable resin is preferably incorporated in a volatile carrier before impregnation so that after impregnation the carrier may be volatilized and the foamable resin dried by mild heat below the foaming temperature, say about 140° to 180° F. By incorporating the foamable resin in a volatile carrier, the foamable resin is rendered less viscous which permits greater ease of application by spraying of the foamable resin in the batt.

After the foamable resin has been incorporated in the batt matrix, the resin impregnated matrix is then heated to a foaming or curing temperature of between about 200° to 400° F. for a suitable period of time, to simultaneously foam the resin about the individual fibers. When the resin is incorporated in a batt matrix of the present invention and caused to foam, the foam "grows" substantially simultaneously along and around the individual fibers 10 and 10A and the resin is supported by the fibers both during the growth period of the foaming operation and after the resin has been set. With resin foams per se, where the foam is self-supporting, it is necessary to employ relatively large quantities of resin foam to achieve desired thicknesses. By employing a batt matrix in accordance with the present invention, much less resin foam is needed to achieve comparable pads.

Figure 4:
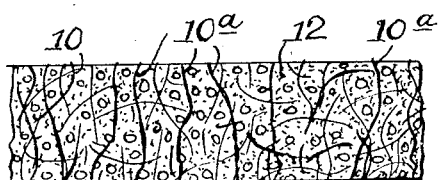
Figure 4 is a sectional view of the pad made in accordance with the present invention.
Figure 5:
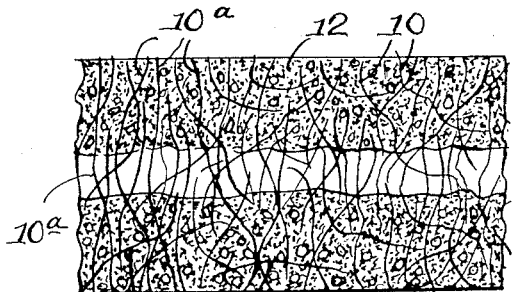
Figure 5 is a sectional view of another pad made in accordance with the present invention.
Figure 6:
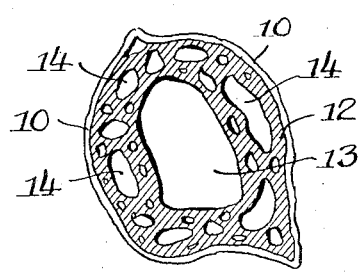
Figure 6 is a greatly enlarged view showing the manner in which the foamed resin is adhered about the individual fibers.

Referring to Figs. 4–6, it will be seen that the foamed resin 12 surrounds the individual fibers 10 and 10A and there are intercommunicating voids 13 in the areas unoccupied by fibers. There are a plurality of additional voids 14 surrounded by resin, which are the result of expansion of the gaseous blowing agent in the foamable resin during the foaming operation. If a resin is caused to foam without a batt matrix, the only voids will be those formed in the resin by the expansion of the gas. With the present invention, a substantially smaller quantity of resin foam is needed to form a pad and a lighter weight pad is thus obtained. This pad has a compression set comparable to pads made from resin foam alone, but they are more stable and lighter in weight and cheaper to make because of the smaller quantities of resin foam employed. They are substantially more tear-resistant than all-resin foam pads because of the additional strength imparted thereto by the batt matrix.

The foaming resins which may be used in accordance with the present invention are well known to the art. The foamable resin may be either thermoplastic or thermosetting depending upon the ultimate use for the finished product. It is preferred that the foamable resin be in liquid form, for example, aqueous emulsion form, for ease of incorporation into the fibrous batt prior to the heating and foaming step. Plasticizers and stabilizers may be added to the foamable resin in accordance with known techniques to adjust the texture of the completed product to that desired.

Suitable foaming resin compositions are disclosed in U.S. Patents Nos. 2,577,279, 2,498,621, 2,572,568, 2,623,023, and 2,461,942. Other foamable resin compositions may, of course, be used. These compositions, as is known, contain blowing agents which engender gases upon being heated to proper temperatures, such as carbon dioxide, ammonium carbonate, potassium carbonate, guanidine carbonate, sodium bicarbonate, ammonium bicarbonate, diazo aminobenzine, diazo aminotoluene, diazo di-isobutyronitrile, hydrogen peroxide and the like. In practice the blowing agents are mechanically admixed wtih suitable plastics or mixtures thereof such as synthetic rubbers like butadiene-acrylonitrile copolymers; synthetic plastic materials like polyvinyl chloride and copolymers of vinyl chloride and other polymerizable monomers such as vinyl acetate; alkyd resins; phenolformaldehyde resins and the like. Foamable resins are commercially available in the market, one such product, which contains polyvinyl chloride, is sold under the name "Vinyafoam" by Interchemical Corporation. The particular foamable material employed will obviously depend upon the physical characteristics desired in the finished product.

Figure 1:
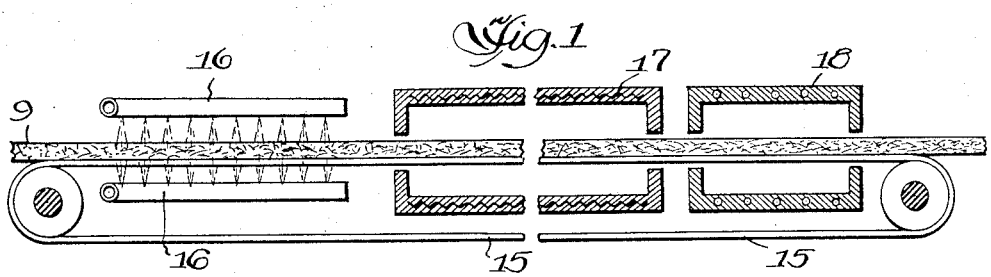
Figure 1 is a diagrammatic view showing a method of making the pad of the present invention.

Figure 1 is a diagrammatic illustration of a continuous method of making the preferred pads in accordance with the present invention. The batt matrix 9, having the construction described is carried by a conveyor belt 15 to a spraying device 16 which lightly sprays both sides of the matrix 9 with a suitable foamable resin composition. It will be obvious that the conveyor 15 is made of porous construction, for example a metal mesh, to permit the foamable resin to pass through. If desired, the matrix 9 may be first sprayed on one side then turned over and sprayed on the other side before further treatment. The force of the spray of foamable resin composition is insufficient to compress the batt matrix. The quantity of foamable resin composition is sufficient to coat the individual fibers of the batt matrix, but insufficient to fill the voids of the batt matrix. Generally about 1 to 10 parts of foamable resin composition, by weight, to one part by weight of the batt, is incorporated in the batt. It is preferred to incorporate about 2 to 4 parts by weight of foamable resin composition to one part by weight of the batt.

After the batt matrix has been sprayed with foamable resin, the resin impregnated batt is carried by the conveyor to a suitable oven 17. The temperature of the oven can be varied, and is adjusted to a desired temperature to either dry the resin impregnated batt to a nontacky state or else to cause the resin to foam interiorly of the pad.

If it is desired to merely dry the foamable resin without causing the resin to foam, the temperature of the oven is less than the temperature which will cause the resin to foam. The length of time that the product remains in the oven depends upon the length of the oven and the speed of the conveyor belt, and can be adjusted with respect to the particular foamable resin employed. After the pad emerges from the oven, it passes into cooling chamber 18 where it is cooled to room temperature by suitable means, for example, by jets of cool air. The batt matrix which emerges from the cooling chamber is non-tacky and dry to the touch, and the individual fibers of the batt matrix are coated with the foamable resin composition and bonded to one another with the foamable resin composition. This product is resilient and may be manipulated without destroying its loft and resiliency. Its thickness is substantially that of the batt 9 before treatment. It may then be packed and stored until some later time when the foamable resin is caused to foam.

When it is desired to obtain a foamed resin pad, the batt matrix impregnated with a foamable resin (either after it has passed through the spraying device 16 or after it has been impregnated with a foamable resin and dried as above described) is carried into oven 17 which is heated to the foaming temperature. This causes the resin to foam and grow along and about the individual fibers 10 and 10A of the batt. The product remains in the oven for a sufficient period of time to cause the resin to foam completely, after which the product is cooled to room temperature in cooling chamber 18. The finished pad which emerges from the cooling chamber has substantially the same thickness as the batt matrix 9 before its impregnation with the foamable resinous material.

Two fiber-reinforced foamed resin pads produced in accordance with the present invention are shown in Figs. 4 and 5. Fig. 4 illustrates a pad in which the resin has been impregnated throughout the entire thickness of the pad. Fig. 5 illustrates a pad in which only the surfaces contain the foamed resin. The pad of Figure 5 permits smaller quantities of foamed resin to be used, with consequent savings in cost. In each illustration, the foamed resin bonds the fibers of the batt into an integral structure having excellent resiliency, loft and feel.

Figure 7:
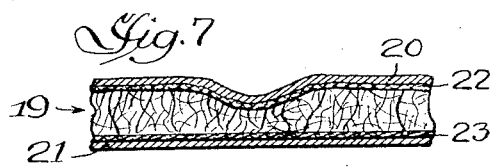
Figure 7 is a sectional view showing the manner in which a batt impregnated with a foamable resin may be compressed within a mold to form a pad of specific configuration.

In some instances, it is desirable to mold the pad of the present invention into a specific configuration. To accomplish this, as shown in Figure 7, the batt matrix 19 is impregnated with a foamable resin. It is then lightly compressed between the surfaces 20 and 21 of a suitable mold. The resin is then caused to foam in the manner above described; the foaming of the resin causing a pad to be formed within the configuration of the mold. If desired, flexible surface sheets 22 and 23 of any suitable material, for example cloth, metal foil, plastic material, etc., may be secured to the resin impregnated matrix by a suitable adhesive before the resin is caused to foam. When the resin is foamed, the pad which is removed from the mold contains the surfacing material secured thereto. It will also be understood that a suitable surfacing material may be secured to the pad whether or not the pad is foamed within a mold.

The following are examples of pads made in accordance with the present invention.

*Example 1*

A batt ¼" thick was made of ½" "nylon" fibers in the random, three-dimensional arrangement described. Both sides of the batt were sprayed lightly with "Vinyafoam" dispersed in a low boiling naphtha (butane fraction) so that 2 parts by weight of the resin composition were incorporated in each part by weight of the batt. The batt was then heated for 5 minutes at 180° F. to drive off the naphtha and dry the "Vinyafoam" to a non-tacky state without causing the resin to foam. The resulting product was then cooled. It was ¼" thick, dry to the touch and could be manipulated and compressed without adversely affecting the resiliency or loft of the batt.

Later, the treated batt was heated to 300° F. for four minutes to cause the resin to foam. It was then cooled by jets of air. A foamed resin pad, ¼" thick, was obtained.

*Example 2*

A 1" thick batt made of "Orlon" fibers 1½" long was treated in the manner described in Example 1 except the batt was impregnated with 3 parts by weight of the resin composition for each part by weight of the batt, and during foaming, the batt was heated to 350° F. The resulting pad was 1" thick.

*Example 3*

2 parts by weight of meta-toluene di-isocyanate were added to 3 parts by weight of a resin made by reacting 4 mols of glycerol, 2.5 mols of adipic acid and ½ mol phthalic anhydride, to make a foamable resin. Three samples of the batt of Example 1 were treated by spraying them lightly with this foamable resin so that 3 parts by weight of the foamable resin were incorporated in one part by weight of the batt.

The first sample was heated to 180° F. to dry the resin to a non-tacky state and form a batt ¼" thick. The batt was bonded by the dried foamable resin. Later the dried batt was heated to 300° F. to foam the resin and create a foamed resin pad ¼" thick.

The second sample was dried as was the first. Cheesecloth surfacing sheets were then placed on each surface of the dried batt after first brushing the surface of the batt with a rubbery copolymer of butadiene and acrylonitrile sold under the trademark "Carbopol." The sample was then compressed in a ³⁄₁₆" mold and heated to 300° F. until the resin had completely foamed. A ³⁄₁₆" foamed pad having cheesecloth surfaces secured thereto was obtained.

The third sample was heated to 300° F. to foam the resin. A pad ¼" thick was obtained which was similar to the foamed resin pad of the first sample.

*Example 4*

A foamable resin composition was prepared containing 1 part of ammonium bicarbonate and 10 parts of alkyd resin prepared by reacting 6 mols of diethylene glycol, 5 mols of fumaric acid, 1 mol of sebacic acid and 10 parts of allyl lactocarbonate in the presence of 0.15 part of benzoyl peroxide. 2 parts of the foamable resin composition were dispersed in 1 part of methylene dichloride as a volatile carrier.

The batt of Example 1 was sprayed with the above composition in an amount equal to four times the weight of the batt. The impregnated batt was then heated to 170° F. to drive off the methylene dichloride and dry the foamable resin to a non-tacky state. A batt ¼" thick bonded with the foamable resin was obtained. Later the dried batt was heated to 250° F. until the resin had completely foamed and polymerized to form a foamed pad ¼" thick.

Preferred embodiments of the invention have been described in considerable detail. It will be understood that the description thereof is intended to be illustrative, rather than restrictive, as many details may be modified or changed without departing from the spirit or scope of the invention. For example, the character of the foamable material, resin, rubber, etc., may be varied, although the foamable resins are preferred because of their commercial availability and low cost. It will therefore be apparent that the present invention is not to be limited to the specific structure, materials and methods described except as limited by the scope of the appended claims.

We claim:

1. The method of making a foamed resin, fiber-reinforced unitary, porous pad in which the foamed resin surrounds and is reinforced by fibers of a loose fibrous batt and in which the porous pad retains substantially the void formation of said batt which comprises the steps of lightly spraying a porous batt of random arranged fibers with a foamable resin to coat the individual fibers of the batt but not to fill the voids thereof, said batt, due to the random arrangement of fibers, having an interconnecting network of voids in all planar directions, heating the foamable resin-containing batt to a temperature sufficient to foam the resin interiorly of said batt and around the fibers thereof, and cooling the pad so formed.

2. In the process of making a foamed resin, fiber-reinforced, unitary, porous pad in which the foamed resin surrounds and is reinforced by fibers of a loose fibrous batt and in which the porous pad retains substantially the void formation of said batt, the steps comprising spraying a porous batt of random arranged fibers with a foamable resin to coat individual fibers of the batt but not to fill the voids thereof, said batt, due to the random arrangement of fibers, having an interconnecting network of voids in all planar directions, drying the coating of foamable resin about the fibers at a temperature below the foaming temperature of the foamable resin, heating the resin-containing batt to a temperature sufficient to foam the resin interiorly of said batt and around the fibers thereof, said resin, when foamed, being insufficient in amount to completely fill said interconnecting voids, and cooling the pad so formed.

3. A method of making a foamed resin, fiber-reinforced, unitary, porous pad in which the foamed resin surrounds and is reinforced by fibers of a loose fibrous batt and in which the porous pad retains substantially the void formation of said batt which comprises the steps of lightly spraying a batt with a liquid foamable resin, said batt comprising a plurality of loosely intermingled fibers in random, three-dimensional arrangement and forming therebetween a labyrinth of interconnecting voids, at least a substantial portion of said fibers being of greater length than the thickness of the batt with some of said fibers extending transversely throughout the depth of the batt to tie the batt into an integral structure, heating the sprayed batt free from any restraining means to a temperature sufficient to dry the liquid foamable resin but below the foaming temperature to bond the fibers of the batt with said foamable resin, then heating the bonded batt free from any restraining means to a temperature sufficient to foam the resin interiorly of said batt and around the fibers thereof, said resin, when foamed, serving to bond the fibers of the batt and being insufficient in amount to completely fill the interconnecting voids, and then cooling the pad so formed.

4. A continuous method of making a foamed, fiber-reinforced, unitary, porous pad in which the foamed resin surrounds and is reinforced by fibers of a loose fibrous batt and in which the porous pad retains substantially the void formation of said batt which comprises the steps of lightly spraying a batt with a liquid foamable composition, said batt comprising a plurality of loosely intermingled fibers in random, three-dimensional arrangement and forming therebetween a labyrinth of interconnecting voids, at least a substantial portion of said fibers being of greater length than the thickness of the batt with some of said fibers extending transversely throughout the depth of the batt to tie the batt into an integral structure, heating the sprayed batt free from any restraining means to a temperature sufficient to dry the liquid foamable composition but below the foaming temperature to bond the fibers of the batt with said foamable composition, then heating the bonded batt free from any restraining means to a temperature sufficient to foam the composition interiorly of said batt and around the fibers thereof, said composition, when foamed, serving to bond the fibers of the batt and being insufficient in amount to completely fill the interconnecting voids, and then cooling the pad so formed.

5. A continuous method of making a foamed, fiber-reinforced, unitary, porous pad in which the foamed resin surrounds and is reinforced by fibers of a loose fibrous batt and in which the porous pad retains substantially the void formation of said batt which comprises the steps of lightly spraying a batt with a liquid foamable composition, said batt comprising a plurality of loosely intermingled fibers in random, three-dimensional arrangement and forming therebetween a labyrinth of interconnecting voids, at least a substantial portion of said fibers being of greater length than the thickness of the batt with some of said fibers extending transversely throughout the depth of the batt to tie the batt into an integral structure, heating the sprayed batt free from any restraining means to a temperature sufficient to foam the composition interiorly of said batt and around the fibers thereof, said composition, when foamed, serving to bond the fibers of the batt and being insufficient in amount to completely fill the interconnecting voids, and then cooling the pad so formed.

6. A method of making a foamable resin, fiber-reinforced, unitary, porous pad in which the foamed resin surrounds and is reinforced by fibers of a loose fibrous batt and in which the porous pad retains substantially the void formation of said batt which comprises the steps of lightly spraying a batt with a liquid foamable resin, said batt comprising a plurality of loosely intermingled fibers in random, three-dimensional arrangement and forming therebetween a labyrinth of interconnecting voids, at least a substantial portion of said fibers being of greater length than the thickness of the batt with some of said fibers extending transversely throughout the depth of the batt to tie the batt into an integral structure, heating the sprayed batt free from any restraining means to a temperature sufficient to dry the liquid foamable resin but below the foaming temperature, said dried foamable resin serving to bond the fibers of the batt and being insufficient in amount to completely fill the interconnecting voids, and then cooling the product so formed.

7. A continuous method of making a foamable, fiber-reinforced, unitary, porous pad in which the foamed resin surrounds and is reinforced by fibers of a loose fibrous batt and in which the porous pad retains substantially the void formation of said batt which comprises the steps of lightly spraying a batt with a liquid foamable composition, said batt comprising a plurality of loosely intermingled fibers in random, three-dimensional arrangement and forming therebetween a labyrinth of interconnecting voids, at least a substantial portion of said fibers being of greater length than the thickness of the batt with some of said fibers extending transversely throughout the depth of the batt to tie the batt into an integral structure, heating the sprayed batt free from any restraining means to a temperature sufficient to dry the liquid foamable composition but below the foaming temperature, said dried foamable composition serving to bond the fibers of the batt and being insufficient in amount to completely fill the interconnecting voids, and then cooling the product so formed.

8. The method of making a foamed, fiber-reinforced, unitary, porous pad in which the foamed resin surrounds and is reinforced by fibers of a loose fibrous batt and in which the porous pad retains substantially the void formation of said batt which comprises the steps of lightly spraying a porous batt of random arranged fibers with a liquid foamable composition without compressing the fibers of the batt, said batt, due to the random arrangement of fibers, having an interconnecting network of voids in all planar directions, heating the sprayed batt free from any restraining means to a temperature sufficient to dry the foamable composition and bond the fibers of the batt but insufficient to foam the foamable composition, heating the bonded batt to a temperature sufficient to foam the composition interiorly of said batt and around the fibers thereof, and then cooling the pad so formed.

9. The method of making a foamed, fiber-reinforced, unitary, porous pad in which the foamed resin surrounds and is reinforced by fibers of a loose fibrous batt and in which the porous pad retains substantially the void formation of said batt which comprises the steps of lightly spraying a porous batt of random arranged fibers with a liquid foamable composition without compressing the fibers of the batt, said batt, due to the random arrangement of fibers, having an inter connecting network of voids in all planar directions, heating the sprayed batt free from any restraining means to a temperature sufficient to dry the foamable composition and bond the fibers of the batt but insufficient to foam the foamable composition, applying an adhesive to at least one surface of said batt, placing flexible surface sheeting on the adhesive-coated surfaces, compressing the batt and surface sheeting within a mold of desired configuration, heating the product within the mold to a temperature sufficient to foam the composition interiorly of said batt and around the fibers thereof, cooling the product so formed, and then removing same from the mold.

10. A foamable resin, fiber-reinforced, unitary, porous pad comprising a fibrous batt matrix having a plurality of normally uncompressed fibers in intermingled, random, three-dimensional arrangement with at least some of said fibers extending transversely throughout the depth of the batt defining a labyrinth of intercommunicating voids, and a non-tacky, dry to the touch, foamable resin adhered to and surrounding at least some of the fibers of said batt matrix to bond the fibers of said batt matrix, said foamable resin being present in an amount insufficient to fill said voids to destroy their intercommunication.

11. A foamable, fiber-reinforced, unitary, porous pad comprising a fibrous batt matrix having a plurality of normally uncompressed fibers in intermingled, random, three-dimensional arrangement with at least some of said fibers extending transversely throughout the depth of the batt defining a labyrinth of intercommunicating voids, and a non-tacky, dry to the touch, foamable composition adhered to and surrounding at least some of the fibers of said batt matrix to bond the fibers of said batt matrix, said foamable composition being present in an amount insufficient to fill said voids to destroy their intercommunication.

12. A foamable resin fiber-reinforced, unitary, porous pad comprising a fibrous batt matrix having a plurality of intermingled fibers defining a labyrinth of intercommunicating voids, and a non-tacky, dry to the touch, foamable resin adhered to and surrounding at least some of the fibers of said batt matrix, said foamable resin being present in an amount insufficient to fill said voids to destroy their intercommunication.

13. A foamable, fiber-reinforced, unitary, porous pad comprising a fibrous batt matrix having a plurality of intermingled fibers defining a labyrinth of intercommunicating voids, and a non-tacky, dry to the touch, foamable composition adhered to and surrounding at least some of the fibers of said batt matrix to bond the fibers of said batt matrix, said foamable composition being present in an amount insufficient to fill said voids to destroy their intercommunication.

References Cited in the file of this patent

UNITED STATES PATENTS

| | | |
|---|---|---|
| 1,906,028 | Weber et al. | Apr. 25, 1933 |
| 1,922,444 | Libbey | Aug. 15, 1933 |
| 2,187,140 | Faris et al. | Jan. 16, 1940 |
| 2,194,036 | Talalay | Mar. 19, 1940 |
| 2,339,142 | Bodle et al. | Jan. 11, 1944 |
| 2,673,824 | Biefeld et al. | Mar. 30, 1954 |
| 2,719,802 | Nottebohn | Oct. 4, 1955 |

OTHER REFERENCES

India Rubber World, Bennett et al., September 1950 (pages 672–3 and 710).